United States Patent [19]

Buse

[11] Patent Number: 4,545,585
[45] Date of Patent: Oct. 8, 1985

[54] MOLDED SEAL GLAND WITH GROOVE FOR COOLING FLUID

[75] Inventor: Frederic W. Buse, Allentown, Pa.

[73] Assignee: Ingersoll-Rand Company, Woodcliff Lake, N.J.

[21] Appl. No.: 679,023

[22] Filed: Dec. 6, 1984

[51] Int. Cl.[4] ............... F16J 15/34; F16J 15/54
[52] U.S. Cl. ................ 277/22; 277/72 FM; 277/75; 277/79; 277/178
[58] Field of Search ............... 277/3, 12, 22, 32, 47, 277/71, 72, 72 FM, 75, 79, 178, 215, 237

[56] References Cited

U.S. PATENT DOCUMENTS 2,824,759  2/1958  Tracy .................... 277/22 X
3,357,706  12/1967  Wilkinson ............ 277/79 X

FOREIGN PATENT DOCUMENTS 374082   4/1923  Fed. Rep. of Germany ...... 277/22
2125529  12/1971  Fed. Rep. of Germany ...... 277/22
2228081  1/1974  Fed. Rep. of Germany ...... 277/22
1415233  9/1965  France ................................ 277/22

Primary Examiner—Robert S. Ward, Jr.
Attorney, Agent, or Firm—R. J. Falkowski

[57] ABSTRACT

A seal gland for a pump shaft made of plastic material and adapted to retain a ceramic seal seat and having an annular groove for circulating cooling fluid around the periphery of the seal seat. The seal gland has an internal cavity part with an inlet and outlet for cooling fluid to be circulated through the gland. Another outlet provides cooling water for flowing around the seal seat through a hole in the supporting groove of the seal gland.

2 Claims, 5 Drawing Figures

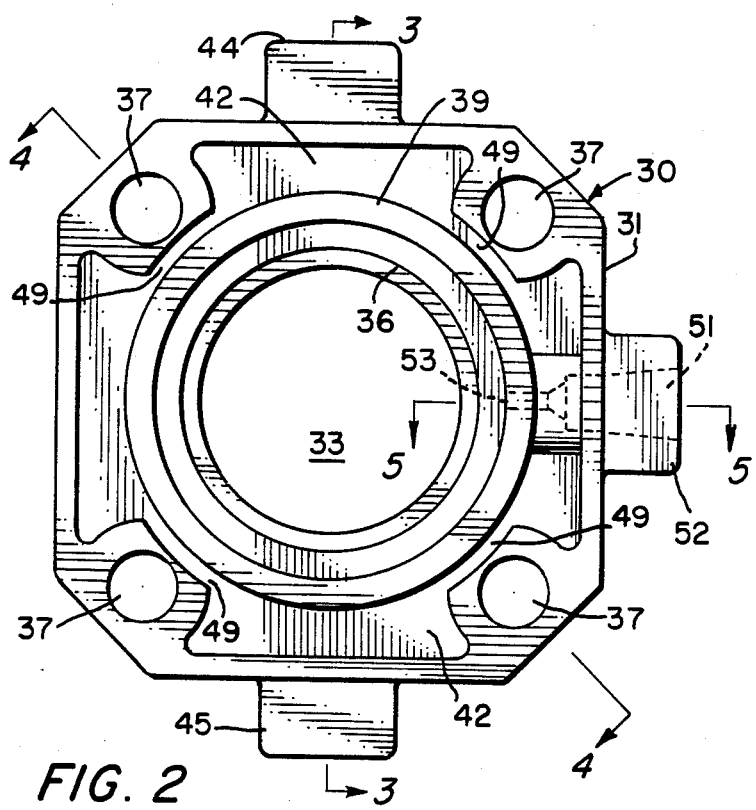
FIG. 2
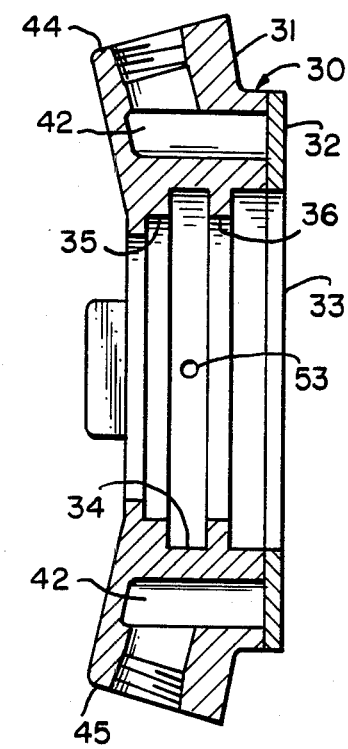
FIG. 3
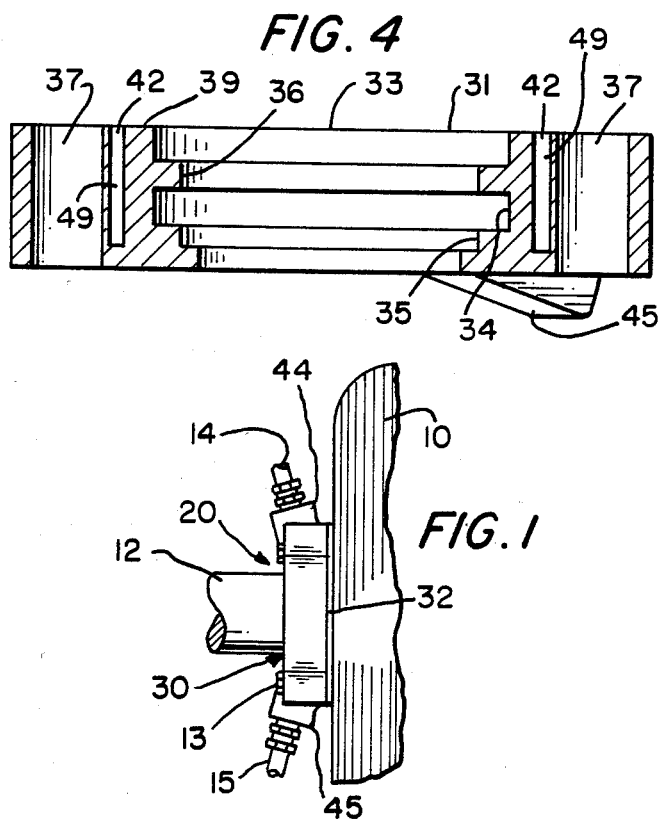
FIG. 4
FIG. 1
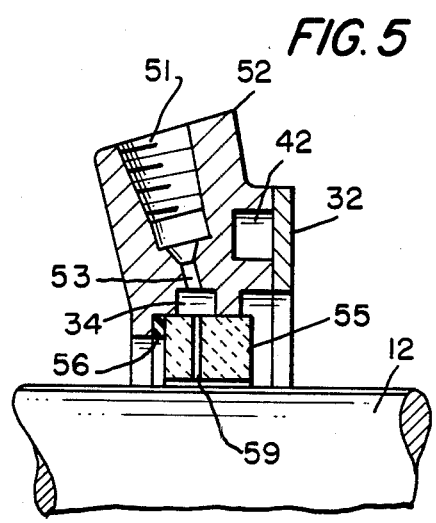
FIG. 5

MOLDED SEAL GLAND WITH GROOVE FOR COOLING FLUID

This invention relates to seal glands for rotating equipment, such as pumps, particularly seal glands made of plastic material for use with pumps made of plastic material.

Presently seal glands for holding seals in place on plastic pumps are solid and molded out of one of several plastic materials such as thermal set vinyl esters. These glands have problems when torque is applied in installation because of resulting cracking and leakage. When used on bigger shafts, larger seals and glands are required and this increases the difficulty in providing glands sufficiently strong to handle the stress increase.

With this invention a seal gland made essentially of polyphenylene sulfide is provided that can be easily manufactured and has sufficient strength to withstand the stresses encountered. The structure of the gland provides a uniform strength in thickness across the gland which enables it to withstand tightening stresses well. Additionally, it provides for some cooling by circulation of cooling fluid through the gland.

The advantages of this invention will be apparent from the following detailed description.

FIG. 1 is a side view of a seal gland according to this invention installed on a pump casing;

FIG. 2 is a top view of the gland shown in FIG. 2 with the cover portion removed;

FIG. 3 is a cross-sectional view of the gland shown in FIG. 2 taken along lines 3—3 of FIG. 2;

FIG. 4 is a cross-sectional view of the gland shown in FIG. 2 taken along lines 4—4 of FIG. 2; and FIG. 5 is a cross-sectional view of the gland shown in FIG. 2 taken along lines 5—5 of FIG. 2.

Referring to FIG. 1 a pump casing cover 10 of a plastic material of any type known in the art has an opening (not shown) for receiving a pump shaft 12 and a gland and seal assembly 20 having a seal gland 30 attached to pump casing 10 by bolts 13 tapped into casing cover 10 in any manner known in the art. A water inlet pipe 14 and an outlet pipe 15 are connected to the gland for providing circulating cooling water through the gland.

Referring to FIG. 3 gland 30 is manufactured by a molding process and comprises a main body 31 and a cover or top portion 32 that is friction welded to main body 31. Gland 30 is made of a polyphenylene sulfide compound with about forty percent of glass fibers by weight.

Referring to FIGS. 2, 3 and 4, main body 31 of gland 30 has a central circular opening 33 forming an annular sealing wall 39 which has an annular circumferential groove 34 adapted to provide a fluid flow path around a seal seat and smaller annular sections 35 and a smaller annular section 36 adapted to receive a seal seat.

Gland main body 31 also comprises four bolt hole openings 37 for receiving bolts 13 to connect the gland to pump casing 10. A central cavity 42 is created by central annular wall 39 and provides continuous communication between an inlet 44 and an outlet 45 for receiving water connections 14 and 15, respectively, as shown in FIG. 1. Internal cavity 42 extends around annular wall 39 and has sections 49 adjacent to bolt holes that extend substantially the depth of the gland and provide for ready passage of cooling water. Openings 44 and 45 communicate with the internal cavity or cut out portion to provide the circulation of cooling water throughout the gland.

Referring to FIGS. 2, 3 and 5, a passage 51 carries fluid source to annular groove 34. Passage 51 extends from a threaded inlet section 52 to an outlet 53 in groove 34.

Referring to FIG. 5, a seal seat 55 surrounds shaft 12 and an outer seal 56 prevents the leakage of cooling fluid in groove 34 to the atmosphere from groove 34. A hole 59 in seal seat 55 permits cooling fluid flow through the seal seat to the shaft and flow out to the mating seal surfaces with a shaft seal (not shown).

I claim:

1. A gland seal made of a plastic material having a main body,
   a central annular wall creating a central cavity,
   a central circular opening created by said annular wall adapted to receive a seal seat,
   a top portion sealing the central cavity,
   an inlet and outlet connection to the central cavity adapted to receive cooling fluid and pass cooling fluid through the cavity, and
   an annular circumferential groove in said central annular passage adapted to surround a seal seat when seated in the central annular passage.

2. A gland seal made of a plastic material having a main body,
   a bolt hole passing through the body,
   a central annular wall creating a central cavity,
   a central circular opening created by said annular wall adapted to receive a seal seat,
   a top portion sealing the central cavity,
   an inlet and outlet connection to the central cavity adapted to receive cooling fluid and pass cooling fluid through the cavity,
   an annular circumferential groove in said central annular passage adapted to surround a seal seat when seated in the central annular passage, and
   an opening connecting between the inlet connection and the annular circumferential groove.

* * * * *